(12) United States Patent
Son et al.

(10) Patent No.: US 7,981,948 B2
(45) Date of Patent: Jul. 19, 2011

(54) ARTIFICIAL STONE AND ASSOCIATED METHODS

(75) Inventors: Chang Ho Son, Daejeongwangyeok-si (KR); Sung Woo Cho, Yeosu-si (KR); Eung Seo Park, Yeosu-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 149 days.

(21) Appl. No.: 12/320,320

(22) Filed: Jan. 23, 2009

(65) Prior Publication Data

US 2009/0203818 A1 Aug. 13, 2009

Related U.S. Application Data

(63) Continuation of application No. PCT/KR2006/005703, filed on Dec. 26, 2006, and a continuation of application No. PCT/KR2006/005708, filed on Dec. 26, 2006.

(30) Foreign Application Priority Data

Jul. 24, 2006 (KR) .................. 10-2006-0069193
Jul. 24, 2006 (KR) .................. 10-2006-0069237

(51) Int. Cl.
*C09D 5/29* (2006.01)
(52) U.S. Cl. ..................................................... 523/171
(58) Field of Classification Search .................. 523/171
See application file for complete search history.

(56) References Cited

U.S. PATENT DOCUMENTS

| 6,335,060 | B1 | 1/2002 | Inoue |
| 6,855,415 | B2 | 2/2005 | Lilly |
| 7,195,857 | B2 | 3/2007 | Tamura et al. |
| 2006/0036010 | A1 | 2/2006 | Kim et al. |
| 2006/0217033 | A1 | 9/2006 | Sung et al. |

FOREIGN PATENT DOCUMENTS

| EP | 0 916 705 A2 | 5/1999 |
| EP | 0 916 705 A3 | 5/1999 |
| JP | 02-036218 A | 2/1990 |
| JP | 09-227189 A | 9/1997 |
| JP | 11-209447 A | 8/1999 |
| JP | 11-236516 A | 8/1999 |
| JP | 2001-098038 A | 4/2001 |
| JP | 2005-097424 A | 4/2005 |
| KR | 10-0383254 B1 | 4/2003 |
| KR | 2003-0097780 A | 12/2003 |
| KR | 10-2004-0005044 A | 1/2004 |
| KR | 10-2006-0014764 A | 2/2006 |
| KR | 10-0555441 B1 | 2/2006 |
| KR | 10-0562634 B1 | 3/2006 |

*Primary Examiner* — Edward J Cain

(74) *Attorney, Agent, or Firm* — Lee & Morse, P.C.

(57) ABSTRACT

An article of artificial stone includes a first resin matrix and a plurality of artificial stone chips in the first resin matrix. The specific gravity of the artificial stone chips is the same as or similar to the specific gravity of the first resin matrix.

21 Claims, 6 Drawing Sheets

FIG. 1

|  |  | Resin | | | Curing Agent | |
|---|---|---|---|---|---|---|
|  |  | Binder | Cross-linking Agent | Acrylic Cross-linking Monomer | | |
| Example | 1 | 85 ppw brominated urethaneacrylate | 5 ppw bromo-styrene | 10 ppw methylmethacrylate | 0.2 ppw benzoyl peroxide | 0.5 ppw bis(4-*tert*-butyl cyclohexyl)peroxydicarbonate |
| | 2 | 80 ppw brominated epoxy acrylate | 5 ppw sytrene monomer | 15 ppw methylmethacrylate | 0.2 ppw benzoyl peroxide | 0.2 ppw bis(4-*tert*-butyl cyclohexyl)peroxydicarbonate |
| | 3 | 85 ppw brominated epoxy acrylate | 5 ppw sytrene monomer | 10 ppw methylmethacryalte | 0.2 ppw benzoyl peroxide | 0.2 ppw bis(4-*tert*-butyl cyclohexyl)peroxydicarbonate |
| | 4 | 85 ppw brominated epoxy acrylate | --- | 15 ppw methylmethacrylate | 0.2 ppw benzoyl peroxide | 0.5 ppw bis(4-*tert*-butyl cyclohexyl)peroxydicarbonate |
| Additional Example | 1 | 90 ppw brominated urethaneacrylate | 10 ppw styrene monomer | --- | 0.2 ppw benzoyl peroxide | 0.5 ppw bis(4-*tert*-butyl cyclohexyl)peroxydicarbonate |
| | 2 | 80 ppw brominated epoxy acrylate | 20 ppw styrene monomer | --- | 0.2 ppw benzoyl peroxide | 0.5 ppw bis(4-*tert*-butyl cyclohexyl)peroxydicarbonate |
| Comparative Example | 1 | 100 ppw polymethylmethacrylate and metylmethacrylate monomer | 2 ppw trimethyl propane triacrylate | --- | 1.0 ppw benzoyl peroxide | 0.1 ppw *n*-dodecyl mercaptan |
| | 2 | 100 ppw unsaturated polyester resin | --- | --- | 1.0 ppw benzoyl peroxide | --- |
| | 3 | 60 ppw epoxy acrylate oligomer | 40 ppw styrene monomer | --- | 1.0 ppw benzoyl peroxide | --- |

FIG. 4

| | | Marble Chips | | | Marble Containing Marble Chips | | | | |
|---|---|---|---|---|---|---|---|---|---|
| | | Chemical Resistance | Specific Gravity | Refractive Index | Levelness | Sanding Property | Concavities | Dispersity of Chips on Surface | Thermal Processability |
| Example | 5 | good | 1.597 | 1.579 | good | good | none | good | 150R good |
| | 6 | good | 1.595 | 1.571 | good | good | none | good | 150R good |
| | 7 | good | 1.624 | 1.581 | good | good | none | good | 150R good |
| | 8 | good | 1.618 | 1.598 | good | good | none | good | 150R good |
| Additional Example | 3 | good | 1.601 | 1.603 | good | cracked chip | occur | good | 250R good |
| | 4 | good | 1.583 | 1.591 | good | cracked chip | none | good | 250R good |
| Comparative Example | 4 | good | 1.183 | 1.490 | good | good | none | poor | 100R good |
| | 5 | poor | 1.203 | 1.531 | good | good | occur | poor | 300R good |
| | 6 | good | 1.194 | 1.542 | good | good | none | poor | 250R good |

FIG. 7

|  |  | Tensile Modulus (kg/cm²) | Flexural Strength (kg/cm²) | Flexural Modulus (kg/cm²) | Refractive Index | Elongation (%) | Specific Gravity (Liquid)/25 °C |
|---|---|---|---|---|---|---|---|
| Example | 11 | 34,390 | 1,289 | 35,760 | 1.574 | 1.15 | 1.583 |
| | 12 | 33,780 | 1,338 | 36,130 | 1.573 | 1.21 | 1.582 |
| | 13 | 36,430 | 1,217 | 35,430 | 1.575 | 1.19 | 1.591 |
| Comparative Example | 7 | 38,780 | 1,213 | 36,220 | 1.543 | 1.22 | 1.246 |
| | 8 | 27,440 | 948.5 | 28,970 | 1.542 | 3.57 | 1.257 |

FIG. 8

|  |  | Sanding Property | Thermal Processability | Dispersion | Chemical Resistance | Levelness |
|---|---|---|---|---|---|---|
| Example | 11 | good | 150R | good | good | good |
| | 12 | good | 150R | good | good | good |
| | 13 | good | 150R | good | good | good |
| Comparative Example | 7 | cracked | 300R | poor | good | good |
| | 8 | cracked | 300R | poor | poor | poor |

ARTIFICIAL STONE AND ASSOCIATED METHODS

CROSS-REFERENCE TO RELATED APPLICATIONS

This application is a continuation of pending PCT Application No. PCT/KR2006/005703, entitled "MARBLE CHIP, METHOD FOR PREPARING THE SAME AND ARTIFICIAL MARBLE USING THE SAME," and pending PCT Application No. PCT/KR2006/005708, entitled "METHOD OF PREPARING RESIN COMPOSITION FOR ARTIFICIAL MARBLE CHIP HAVING HIGH SPECIFIC GRAVITY AND HIGH INDEX OF REFRACTION," both of which were filed on Dec. 26, 2006, and are incorporated by reference herein in their entirety.

BACKGROUND OF THE INVENTION

1. Field of the Invention

Embodiments relate to artificial stone and, more particularly, to artificial stone chips having a good compatibility with a resin matrix.

2. Description of the Related Art

Artificial stone has become widely used as a material for various articles such as counters, tables, etc. In particular, artificial stone including an acrylic resin matrix has been popular due to the excellent appearance, high-class texture and good durability thereof.

An artificial stone having an acrylic resin matrix may be produced by, e.g., combining methyl methacrylate monomer and polymethylmethacrylate with an inorganic filler, artificial stone chips, which may provide the artificial stone with various patterns and colors, and a polymerization initiator to form a slurry. The slurry may then be cast at a suitable temperature to form an article of artificial stone.

During the preparation of the artificial stone, various artificial stone chips may be added to express various patterns and colors. Notably, the appearance of artificial stone, which may be significantly enhanced by the artificial stone chips, may greatly affect the value of the product.

The artificial stone chips may be obtained by pulverizing an article of artificial stone to form chips of various sizes. As the material for the artificial stone chips, an acrylic resin, the same material as a matrix of the artificial stone, may be used.

Recently, transparent artificial stone chips have been used to provide an otherwise-dull artificial stone with a lucid and elegant impression, e.g., a jewel-like appearance. Accordingly, there is a demand for transparent artificial stone chips.

Transparent artificial stone chips have been prepared from polymethylmethacrylate resin or unsaturated polyester resin. Such transparent artificial stone chips may have a specific gravity of 1.15~1.24, which may be lower than that of the resin matrix used for the artificial stone. As a result, the transparent artificial stone chips may float to the upper surface of the resin matrix before or during the curing process. This may result in little or no transparent artificial stone chips at an opposite (lower) surface of the artificial stone, and the artificial stone may not exhibit uniform dispersion of the transparent artificial stone chips. In order to compensate for this effect and distribute the transparent artificial stone chips through to the opposite surface of the artificial stone, more than twice the amount of transparent artificial stone chips may need to be added, which may make it difficult to control the thickness of the artificial stone.

SUMMARY OF THE INVENTION

The present invention is therefore directed to artificial stone, which substantially overcomes one or more of the problems due to the limitations and disadvantages of the related art.

It is therefore a feature of an embodiment to provide an artificial stone chip which may be transparent and may have properties that are the same or substantially similar to those of a resin matrix used to form an article of artificial stone.

It is therefore another feature of an embodiment to provide an artificial stone including artificial stone chips that have properties, e.g., specific gravity, hardness, chemical compatibility, etc., that are the same or substantially similar to those of a resin matrix used to form the article, which may improve the dispersion of the artificial stone chips in the resin matrix and may enable the use of the artificial stone in continuous production processes.

At least one of the above and other features and advantages of these and other embodiments may be realized by providing a polymeric artificial stone chip, including a cured resin composition that includes a reactive monomer and a binder. The binder may include a halogenated urethane acrylate and/or a halogenated epoxyacrylate.

The reactive monomer may include one or more of methyl acrylate, ethyl acrylate, 2-ethyl hexyl acrylate, octyl acrylate, dodecyl acrylate, octadecyl acrylate, methyl cyclohexyl acrylate, isobornyl acrylate, phenyl acrylate, benzyl acrylate, chlorophenyl acrylate, methoxyphenyl acrylate, bromophenyl acrylate, ethylene glycol diacrylate, 1,2-propylene glycol acrylate, 1,3-butanediol diacrylate, 1,3-propylene glycol acrylate, 1,4-butanediol diacrylate, 1,5-pentanediol diacrylate, neopentyl glycol diacrylate, diethylene glycol diacrylate, triethylene glycol diacrylate, dipropylene glycol diacrylate, trimethylolpropane triacrylate, pentaerythritol triacrylate, pentaerythritol tetraacrylate, dipentaerythritol hexaacrylate, ethoxy ethyl acrylate, ethoxy ethyl methacrylate, 1,6-hexanediol diacrylate, glycerol triacrylate, methylpropanediol diacrylate, methyl methacrylate, ethyl methacrylate, 2-ethyl hexyl methacrylate, octyl methacrylate, dodecyl methacrylate, octadecyl methacrylate, methyl cyclohexyl methacrylate, isobornyl methacrylate, phenyl methacrylate, benzyl methacrylate, chlorophenyl methacrylate, methoxyphenyl methacrylate, bromophenyl methacrylate, ethylene glycol dimethacrylate, 1,2-propylene glycol methacrylate, 1,3-butanediol dimethacrylate, 1,3-propylene glycol methacrylate, 1,4-butanediol dimethacrylate, 1,5-pentanediol dimethacrylate, neopentyl glycol dimethacrylate, diethylene glycol dimethacrylate, triethylene glycol dimethacrylate, dipropylene glycol dimethacrylate, trimethylolpropane trimethacrylate, pentaerythritol trimethacrylate, pentaerythritol tetramethacrylate, dipentaerythritol hexamethacrylate, epoxyacrylate of glycidyl acrylic acid, epoxyacrylate of glycidyl methacrylic acid, 1,6-hexanediol dimethacrylate, glycerol trimethacrylate, methylpropanediol dimethacrylate, styrene, halogenated styrene, vinyl toluene, diallyl terephthalate, diallyl phthalate, diallyl carbonate, divinyl benzene, α-methyl styrene, and α-methyl styrene dimer.

The resin composition may include about 50 to about 90 parts by weight of the binder and about 10 to about 50 parts by weight of the reactive monomer, based on the combined weight of the binder and the reactive monomer.

The binder may include the halogenated urethane acrylate, and the halogenated urethane acrylate may have a number average molecular weight of about 900 to about 4,000.

The binder may include the halogenated epoxyacrylate, and the halogenated epoxyacrylate may have a number average molecular weight of about 600 to about 3,500.

The polymeric artificial stone chip may further include relatively small stone particles within the resin composition, such that one or more relatively small stone particles are embedded within the artificial stone chip.

The polymeric artificial stone chip may further include a second resin composition, the second resin composition including a second reactive monomer and a second binder. The second binder may include a halogenated urethane acrylate and/or a halogenated epoxyacrylate, and the resin composition and the second resin composition may differ from one another in one or both of a color and a transparency.

The polymeric artificial stone chip may have a specific gravity of about 1.50 to about 1.67.

The cured resin composition may be substantially free of inorganic filler.

The polymeric artificial stone chip may be transparent.

At least one of the above and other features and advantages of these and other embodiments may also be realized by providing an article of artificial stone, including a first resin matrix, and a plurality of artificial stone chips in the first resin matrix. The specific gravity of the artificial stone chips may be the same as or similar to the specific gravity of the first resin matrix to which the artificial stone chips are added.

The specific gravity of the artificial stone chips may be about 1.50 to about 1.67, and the specific gravity of the first resin matrix before curing may be about 1.40 to about 1.65. The specific gravity of the first resin matrix after curing may be about 1.52 to about 1.83.

The first resin matrix may include an inorganic filler, and the artificial stone chips may be substantially free of inorganic filler.

The polymeric artificial stone chips may be transparent.

The artificial stone chips may include a cured resin composition that includes a reactive monomer and a binder, and the binder may include a halogenated urethane acrylate and/or a halogenated epoxyacrylate.

The reactive monomer may include one or more of methyl acrylate, ethyl acrylate, 2-ethyl hexyl acrylate, octyl acrylate, dodecyl acrylate, octadecyl acrylate, methyl cyclohexyl acrylate, isobornyl acrylate, phenyl acrylate, benzyl acrylate, chlorophenyl acrylate, methoxyphenyl acrylate, bromophenyl acrylate, ethylene glycol diacrylate, 1,2-propylene glycol acrylate, 1,3-butanediol diacrylate, 1,3-propylene glycol acrylate, 1,4-butanediol diacrylate, 1,5-pentanediol diacrylate, neopentyl glycol diacrylate, diethylene glycol diacrylate, triethylene glycol diacrylate, dipropylene glycol diacrylate, trimethylolpropane triacrylate, pentaerythritol triacrylate, pentaerythritol tetraacrylate, dipentaerythritol hexaacrylate, ethoxy ethyl acrylate, ethoxy ethyl methacrylate, 1,6-hexanediol diacrylate, glycerol triacrylate, methylpropanediol diacrylate, methyl methacrylate, ethyl methacrylate, 2-ethyl hexyl methacrylate, octyl methacrylate, dodecyl methacrylate, octadecyl methacrylate, methyl cyclohexyl methacrylate, isobornyl methacrylate, phenyl methacrylate, benzyl methacrylate, chlorophenyl methacrylate, methoxyphenyl methacrylate, bromophenyl methacrylate, ethylene glycol dimethacrylate, 1,2-propylene glycol methacrylate, 1,3-butanediol dimethacrylate, 1,3-propylene glycol methacrylate, 1,4-butanediol dimethacrylate, 1,5-pentanediol dimethacrylate, neopentyl glycol dimethacrylate, diethylene glycol dimethacrylate, triethylene glycol dimethacrylate, dipropylene glycol dimethacrylate, trimethylolpropane trimethacrylate, pentaerythritol trimethacrylate, pentaerythritol tetramethacrylate, dipentaerythritol hexamethacrylate, epoxyacrylate of glycidyl acrylic acid, epoxyacrylate of glycidyl methacrylic acid, 1,6-hexanediol dimethacrylate, glycerol trimethacrylate, methylpropanediol dimethacrylate, styrene, halogenated styrene, vinyl toluene, diallyl terephthalate, diallyl phthalate, diallyl carbonate, divinyl benzene, α-methyl styrene, and α-methyl styrene dimer.

At least one of the above and other features and advantages of these and other embodiments may also be realized by providing an article of artificial stone, including a first resin matrix, and a plurality of artificial stone chips in the first resin matrix. The first resin matrix may include an inorganic filler, and the artificial stone chips may be substantially free of inorganic filler.

The specific gravity of the artificial stone chips may be the same as or similar to the specific gravity of the first resin matrix to which the artificial stone chips are added.

The specific gravity of the artificial stone chips may be about 1.50 to about 1.67, and the specific gravity of the first resin matrix before curing may be about 1.40 to about 1.65. The specific gravity of the first resin matrix after curing may be about 1.52 to about 1.83.

The artificial stone chips may be transparent.

The artificial stone chips may include a cured resin composition that includes a reactive monomer and a binder, and the binder may include a halogenated urethane acrylate and/or a halogenated epoxyacrylate.

The reactive monomer may include methyl acrylate, ethyl acrylate, 2-ethyl hexyl acrylate, octyl acrylate, dodecyl acrylate, octadecyl acrylate, methyl cyclohexyl acrylate, isobornyl acrylate, phenyl acrylate, benzyl acrylate, chlorophenyl acrylate, methoxyphenyl acrylate, bromophenyl acrylate, ethylene glycol diacrylate, 1,2-propylene glycol acrylate, 1,3-butanediol diacrylate, 1,3-propylene glycol acrylate, 1,4-butanediol diacrylate, 1,5-pentanediol diacrylate, neopentyl glycol diacrylate, diethylene glycol diacrylate, triethylene glycol diacrylate, dipropylene glycol diacrylate, trimethylolpropane triacrylate, pentaerythritol triacrylate, pentaerythritol tetraacrylate, dipentaerythritol hexaacrylate, ethoxy ethyl acrylate, ethoxy ethyl methacrylate, 1,6-hexanediol diacrylate, glycerol triacrylate, methylpropanediol diacrylate, methyl methacrylate, ethyl methacrylate, 2-ethyl hexyl methacrylate, octyl methacrylate, dodecyl methacrylate, octadecyl methacrylate, methyl cyclohexyl methacrylate, isobornyl methacrylate, phenyl methacrylate, benzyl methacrylate, chlorophenyl methacrylate, methoxyphenyl methacrylate, bromophenyl methacrylate, ethylene glycol dimethacrylate, 1,2-propylene glycol methacrylate, 1,3-butanediol dimethacrylate, 1,3-propylene glycol methacrylate, 1,4-butanediol dimethacrylate, 1,5-pentanediol dimethacrylate, neopentyl glycol dimethacrylate, diethylene glycol dimethacrylate, triethylene glycol dimethacrylate, dipropylene glycol dimethacrylate, trimethylolpropane trimethacrylate, pentaerythritol trimethacrylate, pentaerythritol tetramethacrylate, dipentaerythritol hexamethacrylate, epoxyacrylate of glycidyl acrylic acid, epoxyacrylate of glycidyl methacrylic acid, 1,6-hexanediol dimethacrylate, glycerol trimethacrylate, methylpropanediol dimethacrylate, styrene, halogenated styrene, vinyl toluene, diallyl terephthalate, diallyl phthalate, diallyl carbonate, divinyl benzene, α-methyl styrene, or α-methyl styrene dimer.

At least one of the above and other features and advantages of these and other embodiments may also be realized by providing a method of preparing a polymeric artificial stone chip, including combining a reactive monomer and a binder to form a resin composition, wherein the binder includes a halogenated urethane acrylate and/or a halogenated epoxyacrylate, curing the resin composition to form a cured solid, and pulverizing the cured solid.

The reactive monomer may include one or more of methyl acrylate, ethyl acrylate, 2-ethyl hexyl acrylate, octyl acrylate, dodecyl acrylate, octadecyl acrylate, methyl cyclohexyl acrylate, isobornyl acrylate, phenyl acrylate, benzyl acrylate, chlorophenyl acrylate, methoxyphenyl acrylate, bromophenyl acrylate, ethylene glycol diacrylate, 1,2-propylene glycol acrylate, 1,3-butanediol diacrylate, 1,3-propylene glycol acrylate, 1,4-butanediol diacrylate, 1,5-pentanediol diacrylate, neopentyl glycol diacrylate, diethylene glycol diacrylate, triethylene glycol diacrylate, dipropylene glycol diacrylate, trimethylolpropane triacrylate, pentaerythritol triacrylate, pentaerythritol tetraacrylate, dipentaerythritol hexaacrylate, ethoxy ethyl acrylate, ethoxy ethyl methacrylate, 1,6-hexanediol diacrylate, glycerol triacrylate, methylpropanediol diacrylate, methyl methacrylate, ethyl methacrylate, 2-ethyl hexyl methacrylate, octyl methacrylate, dodecyl methacrylate, octadecyl methacrylate, methyl cyclohexyl methacrylate, isobornyl methacrylate, phenyl methacrylate, benzyl methacrylate, chlorophenyl methacrylate, methoxyphenyl methacrylate, bromophenyl methacrylate, ethylene glycol dimethacrylate, 1,2-propylene glycol methacrylate, 1,3-butanediol dimethacrylate, 1,3-propylene glycol methacrylate, 1,4-butanediol dimethacrylate, 1,5-pentanediol dimethacrylate, neopentyl glycol dimethacrylate, diethylene glycol dimethacrylate, triethylene glycol dimethacrylate, dipropylene glycol dimethacrylate, trimethylolpropane trimethacrylate, pentaerythritol trimethacrylate, pentaerythritol tetramethacrylate, dipentaerythritol hexamethacrylate, epoxyacrylate of glycidyl acrylic acid, epoxyacrylate of glycidyl methacrylic acid, 1,6-hexanediol dimethacrylate, glycerol trimethacrylate, methylpropanediol dimethacrylate, styrene, halogenated styrene, vinyl toluene, diallyl terephthalate, diallyl phthalate, diallyl carbonate, divinyl benzene, α-methyl styrene, and α-methyl styrene dimer.

The binder may include the halogenated urethane acrylate, and the halogenated urethane acrylate may have a number average molecular weight of about 900 to about 4,000.

The binder may include the halogenated epoxyacrylate, and the halogenated epoxyacrylate may have a number average molecular weight of about 600 to about 3,500.

Forming the resin composition may further include adding relatively small stone particles having a size such that one or more relatively small stone particles are embedded within the artificial stone chip.

The method may further include non-homogeneously combining the resin composition with a second resin composition and then curing the resin composition and the second resin composition. The second resin composition may include a second reactive monomer and a second binder, the second binder including one or more of a halogenated urethane acrylate or a halogenated epoxyacrylate, and the resin composition and the second resin composition may differ from one another in color and/or transparency.

At least one of the above and other features and advantages of these and other embodiments may also be realized by providing a method of preparing an article of artificial stone, including combining a first resin composition and a plurality of artificial stone chips to form a mixture, and curing the mixture. The specific gravity of the artificial stone chips may be the same as or similar to the specific gravity of the first resin composition to which the artificial stone chips are added.

The specific gravity of the artificial stone chips may be about 1.50 to about 1.67, and the specific gravity of the first resin composition before curing may be about 1.40 to about 1.65. The specific gravity of the first resin matrix after curing may be about 1.52 to about 1.83.

The artificial stone chips may include a cured resin composition that includes a reactive monomer and a binder, and the binder may include a halogenated urethane acrylate and/or a halogenated epoxyacrylate.

The reactive monomer may include one or more of methyl acrylate, ethyl acrylate, 2-ethyl hexyl acrylate, octyl acrylate, dodecyl acrylate, octadecyl acrylate, methyl cyclohexyl acrylate, isobornyl acrylate, phenyl acrylate, benzyl acrylate, chlorophenyl acrylate, methoxyphenyl acrylate, bromophenyl acrylate, ethylene glycol diacrylate, 1,2-propylene glycol acrylate, 1,3-butanediol diacrylate, 1,3-propylene glycol acrylate, 1,4-butanediol diacrylate, 1,5-pentanediol diacrylate, neopentyl glycol diacrylate, diethylene glycol diacrylate, triethylene glycol diacrylate, dipropylene glycol diacrylate, trimethylolpropane triacrylate, pentaerythritol triacrylate, pentaerythritol tetraacrylate, dipentaerythritol hexaacrylate, ethoxy ethyl acrylate, ethoxy ethyl methacrylate, 1,6-hexanediol diacrylate, glycerol triacrylate, methylpropanediol diacrylate, methyl methacrylate, ethyl methacrylate, 2-ethyl hexyl methacrylate, octyl methacrylate, dodecyl methacrylate, octadecyl methacrylate, methyl cyclohexyl methacrylate, isobornyl methacrylate, phenyl methacrylate, benzyl methacrylate, chlorophenyl methacrylate, methoxyphenyl methacrylate, bromophenyl methacrylate, ethylene glycol dimethacrylate, 1,2-propylene glycol methacrylate, 1,3-butanediol dimethacrylate, 1,3-propylene glycol methacrylate, 1,4-butanediol dimethacrylate, 1,5-pentanediol dimethacrylate, neopentyl glycol dimethacrylate, diethylene glycol dimethacrylate, triethylene glycol dimethacrylate, dipropylene glycol dimethacrylate, trimethylolpropane trimethacrylate, pentaerythritol trimethacrylate, pentaerythritol tetramethacrylate, dipentaerythritol hexamethacrylate, epoxyacrylate of glycidyl acrylic acid, epoxyacrylate of glycidyl methacrylic acid, 1,6-hexanediol dimethacrylate, glycerol trimethacrylate, methylpropanediol dimethacrylate, styrene, halogenated styrene, vinyl toluene, diallyl terephthalate, diallyl phthalate, diallyl carbonate, divinyl benzene, α-methyl styrene, and α-methyl styrene dimer.

The specific gravity of the artificial stone chips may be about 1.50 to about 1.67, and the specific gravity of the first resin composition before curing may be about 1.40 to about 1.65. The specific gravity of the first resin matrix after curing may be about 1.52 to about 1.83.

At least one of the above and other features and advantages of these and other embodiments may also be realized by providing a method of preparing a resin composition for artificial stone chips, including preparing a halogenated epoxyacrylate resin binder, wherein preparing the halogenated epoxyacrylate resin binder includes reacting a halogenated epoxy resin with an acrylic and/or methacrylic acid, and diluting the halogenated epoxyacrylate resin binder by adding a reactive monomer to the halogenated epoxyacrylate resin binder.

The halogenated epoxy resin may include a bisphenol A type resin and/or a phenol-formaldehyde novolac type resin, and may have an epoxy equivalent of about 250 to about 950.

Reacting the halogenated epoxy resin with the acrylic and/or methacrylic acid may include adding the acrylic and/or methacrylic acid to the halogenated epoxy resin to make an equivalent ratio of halogenated epoxy resin:(acrylic and/or methacrylic acid) of about 1:1 to about 1:1.2.

The method may further include, before adding the acrylic and/or methacrylic acid to the halogenated epoxy resin, melting the halogenated epoxy resin, adding about 0.001 to about 0.04 parts by weight of a polymerization inhibitor to the melted halogenated epoxy resin, and adding about 0.005 to about 0.02 parts by weight of a color modifier to the melted halogenated epoxy resin.

The method may further include, after adding the acrylic and/or methacrylic acid to the halogenated epoxy resin, elevating a temperature of the reaction to about 105° C. to about 125° C., and maintaining an isothermal reaction temperature. The halogenated epoxyacrylate resin binder may be diluted by adding about 5 to about 40 parts by weight of the reactive monomer to about 60 to about 95 parts by weight of the halogenated epoxyacrylate resin binder, based on the combined weight of the halogenated epoxyacrylate resin binder and the reactive monomer.

The reactive monomer may include one or more of methyl acrylate, ethyl acrylate, 2-ethyl hexyl acrylate, octyl acrylate, dodecyl acrylate, octadecyl acrylate, methyl cyclohexyl acrylate, isobornyl acrylate, phenyl acrylate, benzyl acrylate, chlorophenyl acrylate, methoxyphenyl acrylate, bromophenyl acrylate, ethylene glycol diacrylate, 1,2-propylene glycol acrylate, 1,3-butanediol diacrylate, 1,3-propylene glycol acrylate, 1,4-butanediol diacrylate, 1,5-pentanediol diacrylate, neopentyl glycol diacrylate, diethylene glycol diacrylate, triethylene glycol diacrylate, dipropylene glycol diacrylate, trimethylolpropane triacrylate, pentaerythritol triacrylate, pentaerythritol tetraacrylate, dipentaerythritol hexaacrylate, ethoxy ethyl acrylate, ethoxy ethyl methacrylate, 1,6-hexanediol diacrylate, glycerol triacrylate, methylpropanediol diacrylate, methyl methacrylate, ethyl methacrylate, 2-ethyl hexyl methacrylate, octyl methacrylate, dodecyl methacrylate, octadecyl methacrylate, methyl cyclohexyl methacrylate, isobornyl methacrylate, phenyl methacrylate, benzyl methacrylate, chlorophenyl methacrylate, methoxyphenyl methacrylate, bromophenyl methacrylate, ethylene glycol dimethacrylate, 1,2-propylene glycol methacrylate, 1,3-butanediol dimethacrylate, 1,3-propylene glycol methacrylate, 1,4-butanediol dimethacrylate, 1,5-pentanediol dimethacrylate, neopentyl glycol dimethacrylate, diethylene glycol dimethacrylate, triethylene glycol dimethacrylate, dipropylene glycol dimethacrylate, trimethylolpropane trimethacrylate, pentaerythritol trimethacrylate, pentaerythritol tetramethacrylate, dipentaerythritol hexamethacrylate, epoxyacrylate of glycidyl acrylic acid, epoxyacrylate of glycidyl methacrylic acid, 1,6-hexanediol dimethacrylate, glycerol trimethacrylate, methylpropanediol dimethacrylate, styrene, halogenated styrene, vinyl toluene, diallyl terephthalate, diallyl phthalate, diallyl carbonate, divinyl benzene, α-methyl styrene, and α-methyl styrene dimer.

The halogenated epoxyacrylate resin binder may have an acid value of about 1 to about 15.

BRIEF DESCRIPTION OF THE DRAWINGS

The above and other features and advantages of the present invention will become more apparent to those of ordinary skill in the art by describing in detail exemplary embodiments thereof with reference to the attached drawings, in which:

FIG. 1 illustrates a tabulation of data regarding Examples 1-4, Additional Examples 1 and 2, and Comparative Examples 1-3;

FIG. 4 illustrates a tabulation of data regarding Examples 5-8, Additional Examples 3 and 4, and Comparative Examples 4-6;

FIG. 7 illustrates a tabulation of data regarding resins prepared in Examples 11-13 and Additional Examples 7 and 8; and FIG. 8 illustrates a tabulation of data regarding artificial stones having artificial stone chips prepared using the resins of Examples 11-13 and Additional Examples 7 and 8.

DETAILED DESCRIPTION OF THE INVENTION

Figure 2:
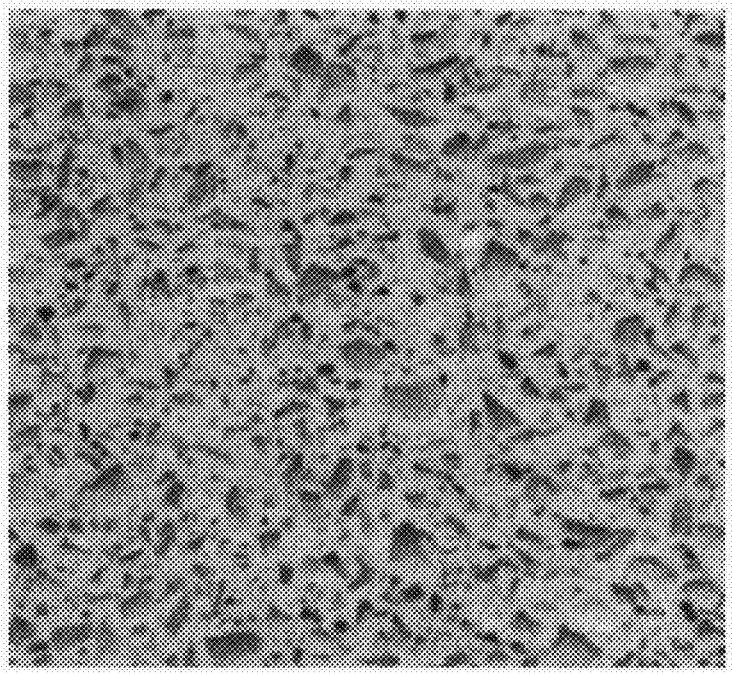
FIG. 2 illustrates a surface pattern of artificial stone obtained in Example 5.

Korean Patent Application No. 10-2006-0069193, filed on Jul. 24, 2006, in the Korean Intellectual Property Office, and entitled: "Marble Chip, Method for Preparing the Same and Artificial Marble Using the Same," and Korean Patent Application No. 10-2006-0069237, filed on Jul. 24, 2006, in the Korean Intellectual Property Office, and entitled: "Method of Preparing Resin Composition for Artificial Marble Chip Having High Specific Gravity and High Index of Refraction," are incorporated by reference herein in their entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include a fourth member, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B and, C together, whereas the expression "either A, B, or C" means one of A alone, B alone, and C alone, and does not mean any of both A and B together; both A and C together; both B and C together; and all three of A, B and C together.

In an embodiment of the present invention, an artificial stone chip may be formed from a resin composition that includes an acrylate monomer and a binder. The binder may include a halogenated urethane acrylate and/or a halogenated epoxyacrylate. The resulting artificial stone chip may have the appearance of, e.g., a marble chip, and may be used for forming articles of artificial stone, e.g., artificial marble countertops, tables, etc, which may be formed in a variety of suitable shapes.

The acrylate monomer may make up about 10% to about 50%, by weight, of the resin composition. In an implementation, the acrylate monomer may make up about 10% to about 40%, by weight, of the resin composition. Preferably, the acrylate monomer may make up about 10% to about 30%, by weight, of the resin composition. The binder may make up about 50% to about 90%, by weight, of the resin composition. In an implementation, the binder may make up about 60% to about 90%, by weight of the resin composition. Preferably, the binder may make up about 70% to about 90%, by weight, of the resin composition.

Using about 50% by weight or more of the binder in the resin composition may help produce a high specific gravity of the resulting artificial stone chip. Using less than about 90% by weight of the binder in the resin composition may help avoid having the viscosity of the resin composition become so high that the process is difficult to control.

The binder used in the resin composition may include a halogenated urethane acrylate and/or a halogenated epoxyacrylate. Of these, the halogenated epoxyacrylate may be preferable.

The resin composition may further include one or more other additives, e.g., a coloring agent, a curing agent, a defoaming agent, a coupling agent, an ultraviolet absorbing agent, a light-diffusing agent, a polymerization inhibitor, an antistatic agent, a flame retardant, and/or a heat stabilizer. Examples of the coloring agent may include, e.g., inorganic or organic pigment, dye, etc. The coloring agent may be added in an amount of about 0.0001% to about 10.0%, by weight, based on the weight of the resin composition.

Where the resin composition includes the halogenated urethane acrylate, the halogenated urethane acrylate may have a number average molecular weight of from about 900 to about 4,000. Where the resin composition includes the halogenated epoxyacrylate, the halogenated epoxyacrylate may have a number average molecular weight of from about 600 to about 3,500. If the number average molecular weight is less than the above ranges, the cross-linking density per unit volume of the artificial stone chip may be high, and the artificial stone chip may be brittle. If the number average molecular weight is more than the above ranges, the cross-linking density of the artificial stone chip may be low, and the artificial stone chip may be soft and it may be difficult to control the process due to high viscosity.

The acrylate monomer may be, e.g., an acrylate and/or a substituted acrylate, which may be, e.g., any of the following: methyl acrylate, ethyl acrylate, 2-ethyl hexyl acrylate, octyl acrylate, dodecyl acrylate, octadecyl acrylate, methyl cyclohexyl acrylate, isobornyl acrylate, phenyl acrylate, benzyl acrylate, chlorophenyl acrylate, methoxyphenyl acrylate, bromophenyl acrylate, ethylene glycol diacrylate, 1,2-propylene glycol acrylate, 1,3-butanediol diacrylate, 1,3-propylene glycol acrylate, 1,4-butanediol diacrylate, 1,5-pentanediol diacrylate, neopentyl glycol diacrylate, diethylene glycol diacrylate, triethylene glycol diacrylate, dipropylene glycol diacrylate, trimethylolpropane triacrylate, pentaerythritol triacrylate, pentaerythritol tetraacrylate, dipentaerythritol hexaacrylate, ethoxy ethyl acrylate, ethoxy ethyl methacrylate, 1,6-hexanediol diacrylate, glycerol triacrylate, methylpropanediol diacrylate, methyl methacrylate, ethyl methacrylate, 2-ethyl hexyl methacrylate, octyl methacrylate, dodecyl methacrylate, octadecyl methacrylate, methyl cyclohexyl methacrylate, isobornyl methacrylate, phenyl methacrylate, benzyl methacrylate, chlorophenyl methacrylate, methoxyphenyl methacrylate, bromophenyl methacrylate, ethylene glycol dimethacrylate, 1,2-propylene glycol methacrylate, 1,3-butanediol dimethacrylate, 1,3-propylene glycol methacrylate, 1,4-butanediol dimethacrylate, 1,5-pentanediol dimethacrylate, neopentyl glycol dimethacrylate, diethylene glycol dimethacrylate, triethylene glycol dimethacrylate, dipropylene glycol dimethacrylate, trimethylolpropane trimethacrylate, pentaerythritol trimethacrylate, pentaerythritol tetramethacrylate, dipentaerythritol hexamethacrylate, epoxyacrylate of glycidyl acrylic acid, epoxyacrylate of glycidyl methacrylic acid, 1,6-hexanediol dimethacrylate, glycerol trimethacrylate, methylpropanediol dimethacrylate, and/or polyethylene glycol dimethacrylate.

In an embodiment, the artificial stone chip may be formed using at least two resin compositions, the resin compositions being different in color and/or transparency from one another. The at least two resin compositions may each include the acrylate monomer and binder described above, and may include other components as well. The two or more resin compositions different in color or transparency from one another may be prepared and then fed onto a conveyer belt simultaneously and cured to form an article having a wave pattern. The article may be pulverized to form marble chips having a wave pattern. In an implementation, a transparent resin composition and an opaque resin composition may be used. By using the resin compositions having different color or transparency, the artificial stone chip obtained therefrom may have a wave pattern or a multi-layered structure.

In an embodiment, the resin composition may further include a cross-linking agent. The cross-linking agent may include, e.g., a styrene monomer, a halogenated styrene, a vinyl toluene, a diallyl terephthalate, a diallyl phthalate, a diallyl carbonate, a divinyl benzene, an α-methyl styrene, and/or an α-methyl styrene dimer.

Embodiments of the above-described artificial stone chip may have a specific gravity of about 1.50 to about 1.67. In an implementation, the specific gravity may be about 1.57 to about 1.64. The specific gravity may be substantially the same as or similar to that of the first resin matrix to which the artificial stone chips are added when forming an article of artificial stone.

Accordingly, artificial stone chips according to embodiments of the present invention may not sink down into the first resin matrix during polymerization of the resin matrix, such that the artificial stone chips may remain uniformly dispersed throughout the resulting artificial stone over a broad range of curing and/or molding times.

In exemplary embodiments, the first resin matrix before curing may have a slightly lower specific gravity than the artificial stone chips. In exemplary embodiments, the first resin matrix may have a specific gravity that differs from the specific gravity of the artificial stone chips by about 0.10 or less before curing. In exemplary embodiments, the first resin matrix may have a specific gravity of about 1.40 to about 1.65 before curing. In an implementation, the specific gravity of the first resin matrix before curing may be about 1.45 to about 1.60. Although not wishing to be bound by any theory or explanation of the invention, it is currently believed that the specific gravity of the first resin matrix may increase after curing, since about 8 to about 10% volume shrinkage of the resin matrix may occur during the curing process. Accordingly, the specific gravity of the first resin matrix after curing may be about 1.52 to about 1.83. In an implementation, the specific gravity of the first resin matrix after curing may be about 1.57 to about 1.77. In exemplary embodiments, the specific gravity of the artificial stone chips is lower than the specific gravity of the cured first resin matrix.

Embodiments of the above-described artificial stone chip may also be transparent. Thus, embodiments of the present invention may provide an artificial stone chip having a specific gravity of about 1.57 to about 1.64 that is transparent, whereas other methods of increasing the specific gravity of artificial stone chips, such as adding inorganic fillers like aluminum trihydrate, barium sulfate, silica, etc., may reduce or eliminate the transparency of the chips. In an implementation, artificial stone chip according to an embodiment may be substantially free of inorganic filler, i.e., may have little of inorganic filler as far as the chips show transparency. In an implementation, the artificial stone chip according to an embodiment may be completely free of inorganic filler.

The above-described artificial stone chip may have substantially similar hardness and abrasive properties with respect to the resin matrix, which may provide the resulting article of artificial stone with good evenness and levelness. The above-described artificial stone chip may also exhibit a high refractive index.

Artificial stone chips according to embodiments of the present invention may be formed by, e.g., adding the acrylate monomer to the binder, which may include the halogenated urethane acrylate and/or a halogenated epoxyacrylate, and curing the resin composition to form an article of artificial stone. The article of artificial stone may then be pulverized to form the artificial stone chip.

As described above, the resin composition may include a binder and an acrylate monomer. The resin composition may further include an additive, e.g., a coloring agent, a defoaming agent, a coupling agent, an ultraviolet absorbing agent, a light diffusing agent, a polymerization inhibitor, an antistatic agent, a flame retardant, and/or a heat stabilizer.

In an embodiment, the curing process may be conducted using a curing agent. Examples of the curing agent include benzoyl peroxide, lauroyl peroxide, bis(4-tert-butyl cyclohexyl)peroxydicarbonate, etc. The amount of the curing agent may be from about 0.03 to about 2.5 parts by weight, preferably from about 0.05 to about 2.0 parts by weight, per 100 parts by weight of the resin composition. In an implementation of the curing process, the resin composition may be cured at from about 50° C. to about 180° C. In an embodiment, a cure controlling agent may be used, which may include, e.g., an amine compound, a sulfonic acid compound, a metallic soap salt, etc. Examples of the metallic soap salt include soap salts of copper, cobalt, potassium, calcium, zirconium, and/or zinc.

In an embodiment, the article of artificial stone may be pulverized to an average size of from about 0.1 to about 50 mm. The pulverizing process may be conducted using any suitable pulverizing technique.

In an embodiment, the article of artificial stone may be deposited with a metal, e.g., a surface of the article may be coated with metal. The metal may include, e.g., aluminum and/or silver. The article having the deposited metal may be pulverized to form chips after the metal deposition process is completed. The artificial stone chip obtained therefrom may provide a three-dimensional visual effect, similar to a jewel, and artificial stone that contains the metal-deposited marble chips may resemble a stone beset with jewels.

Another embodiment of the present invention is directed to an article of artificial stone, which may include artificial stone chips according to one or more embodiments of the present invention, as described above.

The article of artificial stone may be prepared by, e.g., mixing artificial stone chips according to one or more embodiments of the present invention, as described above, into a resin matrix to form a curable composition, and curing the curable composition by a suitable method. The resin matrix may include, e.g., an acrylic resin or an unsaturated polyester. Preferably, the resin matrix includes an acrylic resin. The curable composition may further include an inorganic filler, which may include, e.g., calcium carbonate, aluminum hydroxide, silica, alumina, barium sulfate, magnesium hydroxide, etc. In an implementation, artificial stone chips according to an embodiment may be substantially free of inorganic filler, whereas the resin matrix in which the chips are mixed may include an inorganic filler. Other conventional additives may also be used. The ratios and techniques for adding inorganic filler or additives are not particularly limited, and may be carried out by any suitable means.

Artificial stone according to an embodiment may provide a homogeneous pattern over a wide range of curing times and/or molding times by using artificial stone chips according to one or more embodiments described above, having a specific gravity of about 1.50 to about 1.67. Further, the artificial stone article may be manufactured in a continuous manner.

The artificial stone employing the artificial stone chip of the present invention may be used for various applications such as, e.g., kitchen countertops, wash bowls, dressing tables, various table surfaces, interior articles, etc. The artificial stone may also be pulverized to form particles, which may be used to form another, chip-in-chip type artificial stone chip that contains transparent particles inside.

The artificial stone article employing the artificial stone chip of the present invention may have an appearance and texture similar to an engineered stone, and have good moldability as well. Engineered stone (e-stone) type artificial stones may employ transparent chips in the form of natural silica such as quartz, silica sand, and crystal, etc., or glassy silica such as glass, melted glass, etc. However, these e-stone type artificial stones may be difficult or impossible to manufacture using continuous production methods, because the transparent chips tend to sink down during curing and/or molding, and the sanding property of the transparent chips may be poor. In particular, the sanding property may be poor because the Morse hardness of the resin used as a matrix material may be significantly different from that of the transparent chip, e.g., silica or silica compound, used to form the e-stone. As a result, the e-stone may be difficult to make even and level.

In another embodiment, the resin composition may itself include relatively small stone particles, such that the resulting artificial stone chips produced from the resin composition may be a chip-in-chip type, in which one or more particle-sized chips are inside another chip. The stone particles used for the chip-in-chip resin composition may be, e.g., genuine or artificial stone particles. Where artificial stone particles are used, they may be made from artificial stone according to an embodiment of the present invention, conventional artificial stone, e.g., pulverized conventional acrylic- or unsaturated polyester-based artificial stone, a mixture thereof, etc. The stone particles used for the chip-in-chip resin may include stone particles that are transparent, translucent, and/or opaque.

The above-described embodiments may be better understood by reference to the following Examples, which are intended for the purpose of illustration and are not to be construed as in any way limiting the scope of the present invention, which is defined in the claims appended hereto. In the following examples, all parts and percentages are by weight unless otherwise indicated.

EXAMPLES 1-4

Preparation of Artificial Stone Chips

Example 1

100 grams of a resin mixture, made up of 85 parts by weight (ppw) of brominated urethane acrylate, 5 parts by weight of bromo-styrene and 10 parts by weight of methylmethacrylate, were combined with 0.2 grams of benzoyl peroxide and 0.5 grams of bis(4-tert-butyl cyclohexyl) peroxydicarbonate, and mixed. The resulting mixture was cured at 50° C. The resulting cured article was then pulverized to obtain marble chips having a specific gravity of 1.597.

Example 2

Example 2 was prepared in the same manner as in Example 1, except that 100 grams of a resin mixture, made up of 80 parts by weight of brominated epoxyacrylate, 5 parts by weight of styrene monomer and 15 parts by weight of methylmethacrylate, were combined with 0.01 grams of Phthalocyanine Green (coloring agent), 0.2 grams of benzoyl peroxide (curing agent) and 0.2 grams of bis(4-tert-butyl cyclohexyl) peroxydicarbonate. The artificial stone chips obtained therefrom had a specific gravity of 1.595 and showed a green color.

Example 3

Example 3 was prepared in the same manner as in Example 1, except that 100 grams of a resin mixture, made up of 85 parts by weight of brominated epoxyacrylate, 5 parts by weight of styrene monomer and 10 parts by weight of methylmethacrylate, were combined with 0.2 grams of benzoyl peroxide and 0.2 grams of bis(4-tert-butyl cyclohexyl) peroxydicarbonate. The artificial stone chips obtained therefrom had a specific gravity of 1.624.

Example 4

Example 4 was prepared in the same manner as in Example 1, except that 100 grams of a resin mixture, made up of 85 parts by weight of brominated epoxyacrylate and 15 parts by weight of methylmethacrylate, were combined with 0.2 grams of benzoyl peroxide and 0.5 grams of bis(4-tert-butyl cyclohexyl) peroxydicarbonate. The artificial stone chips obtained therefrom had a specific gravity of 1.618.

Additional Example 1

Additional Example 1 was prepared in the same manner as in Example 1, except that 100 grams of a resin mixture, made up of 90 parts by weight of brominated urethane acrylate and 10 parts by weight of styrene monomer, were combined with 0.2 grams of benzoyl peroxide and 0.5 grams of bis(4-tert-butyl cyclohexyl) peroxydicarbonate. The artificial stone chips obtained therefrom had a specific gravity of 1.601.

Additional Example 2

Additional Example 2 was prepared in the same manner as in Example 1, except 100 grams of a resin mixture, made up of 80 parts by weight of brominated epoxyacrylate and 20 parts by weight of styrene monomer, were combined with 0.2 grams of benzoyl peroxide and 0.5 grams of bis(4-tert-butyl cyclohexyl)peroxydicarbonate. The artificial stone chips obtained therefrom had a specific gravity of 1.583.

Comparative Example 1

Comparative Example 1 was prepared in the same manner as in Example 1, except that 100 grams of a syrup, made up of polymethylmethacrylate and methylmethacrylate monomer, were combined with 2 grams of trimethyl propane triacrylate, 0.1 grams of n-dodecyl mercaptan and 1.0 grams of benzoyl peroxide. The artificial stone chips obtained therefrom had a specific gravity of 1.183.

Comparative Example 2

Comparative Example 2 was prepared in the same manner as in Example 1, except that an unsaturated polyester resin (TP-145×, Aekyung Chemical Co. (Korea)) and 1.0 part by weight of benzoyl peroxide, based on the weight of the unsaturated polyester resin, were used. The artificial stone chips obtained therefrom had a specific gravity of 1.203.

Comparative Example 3

Comparative Example 3 was prepared in the same manner as in Example 1, except that 100 grams of a vinyl ester resin (DION-9120, Aekyung Chemical Co. (Korea)), made up of 60 parts by weight of epoxyacrylate oligomer and 40 parts by weight of styrene monomer, were combined with 1.0 part by weight of benzoyl peroxide, based on the weight of the vinyl ester resin. The artificial stone chips obtained therefrom had a specific gravity of 1.194.

The components of the artificial stone chips of Examples 1-4, Additional Examples 1 and 2, and Comparative Examples 1-3 are tabulated FIG. 1.

EXAMPLES 5-8

Preparation of Artificial Stone

Example 5

50 grams of artificial stone chips obtained from Example 1 were added to a mixture of 100 grams of a syrup made up of polymethylmethacrylate and methylmethacrylate monomer, 180 grams of aluminum hydroxide, 2 grams of trimethyl propane triacrylate, 0.1 grams of n-dodecyl mercaptan, 0.1 grams of defoaming agent, 0.1 grams of dispersing agent and 1.0 grams of benzoyl peroxide to form a curable composition. The specific gravity of the mixture before adding the artificial stone chips was 1.56. The curable composition was stirred sufficiently and cured at 60° C. by means of a continuous molding process to obtain an artificial stone. A photograph of the artificial stone is shown in FIG. 2.

Example 6

Figure 3:
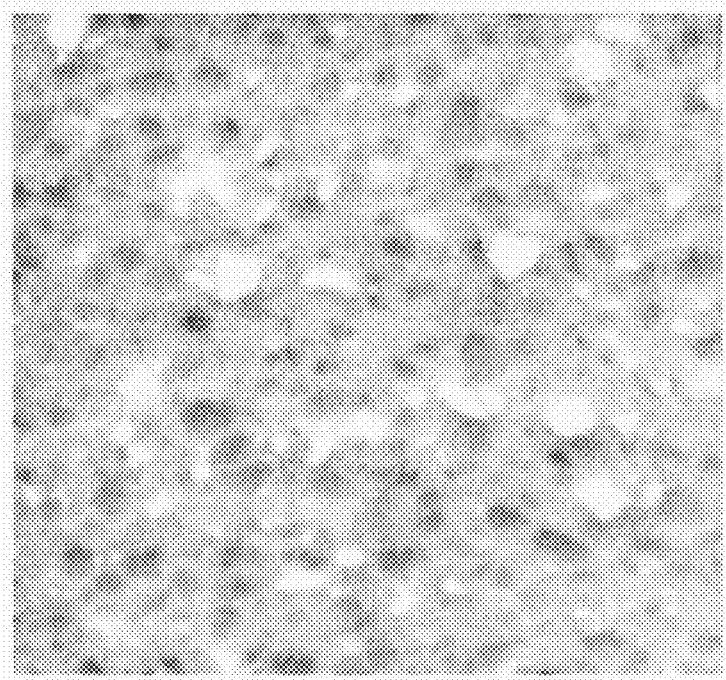
FIG. 3 illustrates a surface pattern of artificial stone obtained in Example 6.

Example 6 was prepared in the same manner as Example 5, except that colored transparent artificial stone chips prepared from Example 2 were used. A photograph of the artificial stone is shown in FIG. 3.

Example 7

Example 7 was prepared in the same manner as in Example 5, except that artificial stone chips prepared from Example 3 were used.

Example 8

Example 8 was prepared in the same manner as in Example 5, except that artificial stone chips prepared from Example 4 were used.

Additional Example 3

Additional Example 3 was prepared in the same manner as in Example 5, except that artificial stone chips prepared from Additional Example 1 were used.

Additional Example 4

Additional Example 4 was prepared in the same manner as in Example 5, except that artificial stone chips prepared from Additional Example 2 were used.

Comparative Example 4

Comparative Example 4 was prepared in the same manner as in Example 5, except that artificial stone chips prepared from Comparative Example 1 were used.

Comparative Example 5

Comparative Example 5 was prepared in the same manner as in Example 5, except that artificial stone chips prepared from Comparative Example 2 were used.

Comparative Example 6

Comparative Example 6 was prepared in the same manner as in Example 5, except that artificial chips prepared from Comparative Example 3 were used.

The physical properties of the artificial stones of Examples 5-8, Additional Examples 3 and 4, and Comparative Examples 4-6 are tabulated in FIG. 4. For each of Examples 5-8, Additional Examples 3 and 4, and Comparative Examples 4-6, the specific gravity of the mixture before adding the artificial stone chips was 1.56, The physical properties tabulated in FIG. 4 were determined as follows:

Chemical Resistance The surfaces of artificial stone chips were evaluated after dipping into 1.0 N of hydrochloric acid and 1.0 N of aqueous ammonia solution at 25° C. for 48 hours.

Refractive Index The refractive index was measured using an Abbe-type refractometer (3T) at 25° C.

Levelness: After sanding the surface of the artificial stone, the levelness of interface between the artificial stone chips and the surrounding matrix was evaluated visually.

Sanding Property After sanding the surface of the artificial stone with sandpaper, the appearance of marble chip was evaluated visually.

Concavities: Concavities were evaluated visually, and indicate whether or not cracks between artificial stone chips and the matrix, or sinking of artificial stone chips occurred.

Thermal Processability The artificial stone was subjected to heating at 180° C. for 20 minutes, followed by cutting a curve in the heated artificial stone. Thermal processability was then evaluated by determining the minimum curve radius (R, in millimeters) where crack or protrusion of chip did not occur.

Referring to FIG. 4, in Examples 5-8, the artificial stone chips exhibited a relatively high specific gravity and good physical properties, especially good thermal processability at a radius of 150 mm. In Additional Examples 3 and 4, the artificial stone chips also exhibited a relatively high specific gravity and good physical properties as compared to Comparative Examples 4-6, although the chips were cracked during the sanding property test and the thermal processability was somewhat reduced relative to Examples 5-8.

In Comparative Example 4, although thermal processability was good, the dispersion of the artificial stone chips on the surface of the artificial stone was poor, and the refractive index of the artificial stone chip was low, such that the texture did not appear similar to quartz, and the artificial stone did not have an appearance similar to that of an engineered stone. In Comparative Example 5, the dispersion of transparent chips on the surface of the artificial stone, thermal processability and chemical resistance were reduced, and concavities occurred. In Comparative Example 6, the dispersion of transparent chips on the surface of the artificial stone was not uniform and the composition presented difficulties for continuous production of artificial stone.

Example 9

Preparation of Artificial Stone Containing Artificial Stone Chip-in-Chips 10 grams of particle-sized marble chips, prepared by pulverizing an acrylic artificial stone to a size range of about 0.01 to about 5 mm, were added to the resin mixture of Example 2, followed by curing. The cured article was pulverized to obtain artificial stone chips. The resultant artificial stone chips were chip-in-chip type, wherein colored particles were inside.

Figure 5:
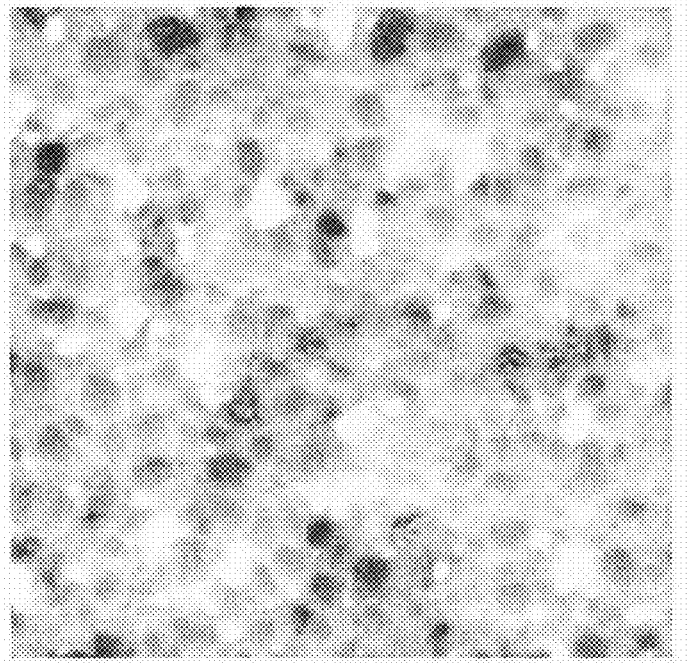
FIG. 5 illustrates a surface pattern of artificial stone obtained in Example 9.

Artificial stone was then prepared using the chip-in-chip type artificial stone chips, using the same process as in Example 5, except that the chip-in-chip type artificial stone chips were used. A photograph of the prepared artificial stone is shown in FIG. 5.

Example 10

Preparation of Artificial Stone Containing Artificial Stone Chips having a Wave Pattern Resin mixture (a) and resin mixture (b) were prepared as follows. Resin mixture (a) was prepared by adding 0.1 grams of carbon black as a coloring agent to a resin mixture prepared as for Example 1. Resin mixture (b) was prepared by adding 0.1 grams of iron oxide red as a coloring agent to another resin mixture prepared as for Example 1.

The resin mixtures (a) and (b) were fed onto a conveyer belt simultaneously in equal amounts and cured to obtain a cured article having a wave pattern. The cured article was pulverized to 0.1~30 mm to obtain marble chips having a wave pattern.

Figure 6:
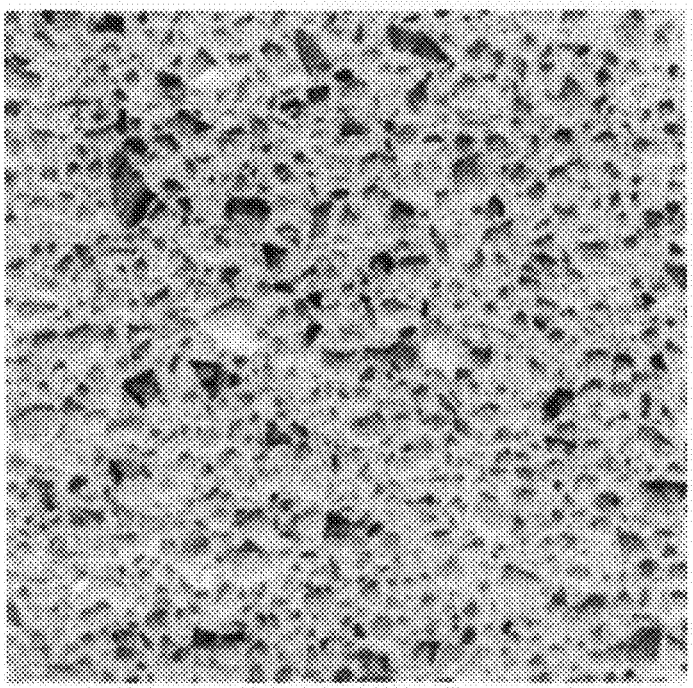
FIG. 6 illustrates a surface pattern of artificial stone obtained in Example 10.

Artificial stone was prepared in the same manner as in Example 5, except that the marble chips having a wave pattern were used. A photograph of the artificial stone is shown in FIG. 6.

In another embodiment, a method of preparing a resin composition for an artificial stone chip may include preparing a halogenated epoxyacrylate resin binder and diluting the halogenated epoxyacrylate resin binder by adding a reactive monomer thereto. The reactive monomer may include, e.g., any of the above-described acrylate monomers and/or cross-linking agents. Thus, the reactive monomer may include, e.g., an acrylate monomer and a cross-linking agent.

Preparing the halogenated epoxyacrylate resin binder may include reacting a halogenated epoxy resin with an acrylic and/or methacrylic acid. The halogenated epoxyacrylate may be employed as a resin composition for a binder of an artificial stone chip. The resulting artificial stone chip may have a high specific gravity and a high transparency.

Generally, the method according to this embodiment may include preparation of the halogenated epoxyacrylate resin binder and dilution with the reactive monomer. Preparation of the halogenated epoxyacrylate resin binder may include fluidization of a halogenated epoxy resin, addition of a polymerization inhibitor and/or color modifier, and a dropping reaction to add a reaction catalyst, and an acrylic and/or methacrylic acid, followed by a reaction period. Dilution with the reactive monomer may include adding a polymerization inhibitor (which may be the same as that used in the preparation of the halogenated epoxyacrylate resin binder) and dilution with the reactive monomer. A particular implementation of this embodiment will now be described.

Preparation of Halogenated Epoxyacrylate Resin Binder

Melting of Halogenated Epoxy Resin

Preparation of the halogenated epoxyacrylate resin binder may include melting a halogenated epoxy resin. The halogenated epoxy resin may include, e.g., a bisphenol A type resin or a phenol-formaldehyde novolac type resin. The halogenated epoxy resin may have an epoxy equivalent of about 250 to about 950.

About 50-80 parts by weight of the halogenated epoxy resin may be fed into a reactor, which may be equipped with a stirrer, a thermometer, a packed condenser and a dropping funnel. Then, the temperature of the reactor may be increased to melt the halogenated epoxy resin, while introducing a cover gas, e.g., nitrogen gas or air, into the reactor. When melting of the halogenated epoxy resin is observed, the contents of the reactor may be heated to, e.g., about 85-95° C.

Addition of Polymerization Inhibitor and Color Modifier

After the halogenated epoxy resin is melted to the extent that stirring is smooth, the feeding of the cover gas may be stopped. A polymerization inhibitor and/or a color modifier may be added to the reactor. The amount of the polymerization inhibitor may be about 0.001 to about 0.04 parts by weight and the amount of the color modifier may be about 0.005 to about 0.02 parts by weight. After the addition of polymerization inhibitor and/or color modifier, the content of the reactor may be stirred while feeding the cover gas into the reactor.

The polymerization inhibitor may be one or more of, e.g., hydroquinone, toluhydroquinone, hydroquinone monomethylether, parabenzoquinone, dimethylparabenzoquinone, or p-tert-butyl catechol.

The color modifier may be one or more of, e.g., phosphorous acid or a phosphorus compound. Suitable phosphorus compounds may include, e.g., Naphthobin KX-405 (Metyl Gesellschaft AG (Germany)). Suitable antioxidants may include, e.g., IRGANOX® 1010 and/or 1076 (Ciba Specialty Chemicals (Switzerland)).

Dropping Reaction

After the addition of the polymerization inhibitor and the color modifier, a mixed solution of a reaction catalyst and one or more of acrylic acid and/or methacrylic acid may be added in a dropping reaction, e.g., by adding dropwise into the reactor by means of a dropping funnel, to make a equivalent ratio of halogenated epoxy resin:(acrylic and/or methacrylic acid) of about 1:1 to about 1:1.2. Without being bound by theory, it is believed that, by dropping the mixed solution into the halogenated epoxy resin, the terminal glycidyl group of the halogenated epoxy resin may be subjected to a ring-opening reaction.

In an implementation, the dropping reaction may be initiated in about 1 minute. The amount of reaction catalyst may be about 1.5-4.0% by weight. The dropping may be conducted over a predetermined period, e.g., a period of from about 1 to about 4 hours, maintaining the temperature of the reactor at, e.g., about 85° C. to about 100° C.

The reaction catalyst may include, e.g., triethylamine, ethyltrimethyl ammonium bromide, dimethylbenzylamine, di-n-butylamine, dimethylphenylbenzylamine, tetramethylammonium chloride, chromium acetyl acetate, triphenyl styphine, dimethylphenylbenzylammonium chloride, triphenyl phosphine, ethylmethyl imidazole, and/or dimethyl imidazole.

Reaction

After the dropping reaction, the contents of the reactor may be heated, e.g., to a temperature of about 105° C. to about 125° C. The temperature may be maintained at constant temperature, such that the reaction proceeds isothermally or substantially isothermally, until the halogenated epoxyacrylate resin binder has a number average molecular weight of about 1,000 to about 4,000, and an acid value of less than about 15. In an implementation, the acid value may be about 7 to about 15. If the acid value is less than about 15, it may be easier to produce artificial stone chips, because it may be possible to reduce or avoid gelation when reacting with the reactive monomer.

Addition of Reactive Monomer

The halogenated epoxyacrylate resin binder prepared as described above may be cooled, e.g., to a temperature of about 100° C. to about 105° C. The feeding of the cover gas may be stopped. A polymerization inhibitor, which may be the same as described above, may again be added, e.g., in an amount of about 0.001 to about 0.04 parts by weight, followed by cooling to a temperature of about 90° C. to about 95° C. Then, the halogenated epoxyacrylate resin binder may be diluted by adding the reactive monomer to the binder.

The amount of the halogenated epoxyacrylate resin binder used may be about 60 to about 95 parts by weight, and the amount of the reactive monomer used may be about 5 to about 40 parts by weight. In an implementation, the amount of the halogenated epoxyacrylate resin binder used may be from about 65 to about 90 parts by weight and the amount of the reactive monomer used may be from about 10 to about 35 parts by weight. An amount of the halogenated epoxyacrylate resin binder that is from about 70 to about 90 parts by weight, and an amount of the reactive monomer that is from about 10 to about 30 parts by weight, may be particularly suitable.

The use of about 60 or more parts by weight of the binder may provide an artificial stone chip having a suitably high specific gravity. The use of less than about 95 parts by weight of the binder may help prevent the viscosity of the resin composition from becoming too high, which may make the process easier to control.

In some embodiments, the binder may further include a halogenated urethane acrylate.

The reactive monomer may be one of the above-described acrylate monomers. Thus, examples of the reactive monomer include the following acrylate monomers: methyl acrylate, ethyl acrylate, 2-ethyl hexyl acrylate, octyl acrylate, dodecyl acrylate, octadecyl acrylate, methyl cyclohexyl acrylate, isobornyl acrylate, phenyl acrylate, benzyl acrylate, chlorophenyl acrylate, methoxyphenyl acrylate, bromophenyl acrylate, ethylene glycol diacrylate, 1,2-propylene glycol acrylate, 1,3-butanediol diacrylate, 1,3-propylene glycol acrylate, 1,4-butanediol diacrylate, 1,5-pentanediol diacrylate, neopentyl glycol diacrylate, diethylene glycol diacrylate, triethylene glycol diacrylate, dipropylene glycol diacrylate, trimethylolpropane triacrylate, pentaerythritol triacrylate, pentaerythritol tetraacrylate, dipentaerythritol hexaacrylate, ethoxy ethyl acrylate, ethoxy ethyl methacrylate, 1,6-hexanediol diacrylate, glycerol triacrylate, methylpropanediol diacrylate, methyl methacrylate, ethyl methacrylate, 2-ethyl hexyl methacrylate, octyl methacrylate, dodecyl methacrylate, octadecyl methacrylate, methyl cyclohexyl methacrylate, isobornyl methacrylate, phenyl methacrylate, benzyl methacrylate, chlorophenyl methacrylate, methoxyphenyl methacrylate, bromophenyl methacrylate, ethylene glycol dimethacrylate, 1,2-propylene glycol methacrylate, 1,3-butanediol dimethacrylate, 1,3-propylene glycol methacrylate, 1,4-butanediol dimethacrylate, 1,5-pentanediol dimethacrylate, neopentyl glycol dimethacrylate, diethylene glycol dimethacrylate, triethylene glycol dimethacrylate, dipropylene glycol dimethacrylate, trimethylolpropane trimethacrylate, pentaerythritol trimethacrylate, pentaerythritol tetramethacrylate, dipentaerythritol hexamethacrylate, epoxyacrylate of glycidyl acrylic acid, epoxyacrylate of glycidyl methacrylic acid, 1,6-hexanediol dimethacrylate, glycerol trimethacrylate, methylpropanediol dimethacrylate, and polyethylene glycol dimethacrylate. The acrylate monomers may be used alone, in combination with other acrylate monomers, in combination with one or more of the cross-linking agents, etc.

The reactive monomer may also include one of the above-described cross-linking agents. Thus, examples of the reactive monomer may include the following cross-linking agents: a styrene monomer, a halogenated styrene, a vinyl toluene, a diallyl terephthalate, a diallyl phthalate, a diallyl carbonate, a divinyl benzene, an α-methyl styrene, and an α-methyl styrene dimer. The cross-linking agents may be used alone, in combination with other cross-linking agents, in combination with one or more reactive monomers such as acrylate monomers, etc.

The resin composition for stone chip may be cured by cooling, e.g., to about 60° C. or below. A cure controlling agent, e.g., one or more metallic soap salts, may be used to control the curing. The amount of the cure controlling agent may be, e.g., about 0.00005 to about 0.0002 parts by weight. Examples of the metallic soap salt include, e.g., soap salts of copper, cobalt, potassium, calcium, zirconium, and/or zinc.

The resin composition may further include one or more additives, e.g., a defoaming agent, a coupling agent, a pigment, a dye, an ultraviolet absorbing agent, a light diffusing agent, a polymerization inhibitor, a cure controlling agent, an antistatic agent, a flame-retardant, and/or a heat stabilizer.

The above-described embodiments may be better understood by reference to the following Examples, which are intended for the purpose of illustration and are not to be construed as in any way limiting the scope of the present invention, which is defined in the claims appended hereto. In the following Examples, all parts and percentage are by weight unless otherwise indicated.

Example 11

In Example 11, 28.4 grams of brominated bisphenol A type epoxy resin (D.E.R.542, Dow Chemical Co. (U.S.A.)) and 39.5 grams of brominated bisphenol A type epoxy resin (D.E.R.560, Dow Chemical Co. (U.S.A.)) were fed into a reactor equipped with a stirrer, a thermometer, a packed condenser and a dropping funnel, and heated to the reaction temperature of 85-95° C. while introducing a nitrogen gas cover gas into the reactor. 0.01 grams of a color modifier (Naphthobin KX-405), and 0.003 grams of hydroquinone monomethylether and 0.009 grams of toluhydroquinone as polymerization inhibitors were added. A mixed solution of 15.2 grams of acrylic acid and 0.3 grams of dimethylbenzylamine in a dropping funnel was added dropwise into the reactor in 1 minute. Then, the temperature of the contents of the reactor was increased to 110° C. by exothermic reaction. The resulting brominated epoxyacrylate resin binder had a number average molecular weight of 2,900 and an acid value of less than 15.

The brominated epoxyacrylate resin binder was cooled to 105° C. The feeding of cover gas was stopped. 0.004 grams of hydroquinone monomethylether was added, followed by cooling to 90° C. The brominated epoxyacrylate resin binder was diluted with a solution of 4.2 grams of styrene monomer, 13.8 grams of methylmethacrylate and 0.00007 grams of copper naphthenate, followed by quenching below 60° C. to obtain a resin.

Example 12

Example 12 was conducted in the same manner as in Example 11, except that 67.8 grams of brominated bisphenol A type epoxy resin (Bakelite 523, Hexion Specialty Chemicals (U.S.A.)), 0.01 grams of Naphthobin KX-405, 0.005 grams of hydroquinone monomethylether, 0.006 grams of toluhydroquinone, 14.2 grams of acrylic acid and 0.32 grams of dimethylbenzylamine were employed for preparing the binder.

The brominated epoxyacrylate resin binder was cooled to 100° C. The feeding of the cover gas was stopped. 0.004 grams of hydroquinone monomethylether was added, followed by cooling to 95° C. The brominated epoxyacrylate resin binder was diluted by adding 19.8 grams of methyl methacrylate, followed by quenching below 60° C. to obtain a resin.

Example 13

Example 13 was prepared in the same manner as in Example 11, except that 65.9 grams of brominated bisphenol A type epoxy resin (YDB-400, Kukdo Chemical Co., Ltd. (Korea)), 0.01 grams of Naphthobin KX-405, 0.006 grams of hydroquinone monomethylether, 0.009 grams of toluhydroquinone, 15.9 grams of methacrylic acid and 0.32 grams of dimethylbenzylamine were used for preparing the binder.

The brominated epoxyacrylate resin binder was cooled to 105° C. The feeding of the cover gas was stopped. 0.004 grams of hydroquinone monomethylether was added, followed by cooling to 95° C. The brominated epoxyacrylate resin binder was diluted with a solution of 1.2 grams of styrene monomer and 18.3 grams of methylmethacrylate, followed by quenching below 60° C. to obtain a resin.

Comparative Example 7

Comparative Example 7 was prepared in the same manner as in Example 11, except that 18.9 grams of non-halogenated bisphenol A type epoxy resin (YD-128, Kukdo Chemical Co., Ltd. (Korea)), 43.3 grams of bisphenol A type epoxy resin (YD-012, Kukdo Chemical Co., Ltd. (Korea)) and 18.2 grams of acrylic acid were used for preparing the epoxyacrylate resin binder.

The epoxyacrylate resin binder was cooled to 105° C. The feeding of the cover gas was stopped. 0.004 grams of p-tert-butyl catechol was added, followed by cooling to 95° C. To the epoxyacrylate resin binder, 19.2 grams of styrene monomer and 0.00007 grams of copper naphthenate were added followed by quenching below 60. C to obtain a resin.

Comparative Example 8

In Comparative Example 8, 13.9 grams of isophthalic acid, 16.6 grams of phthalic anhydride, 17.1 grams of maleic anhydride, 19.5 grams of propylene glycol and 22.3 grams of neopentyl glycol were added into a reactor equipped with a stirrer, a thermometer, a nitrogen inlet duct, a packed condenser and a condenser, while introducing a nitrogen gas cover gas into the reactor. The reaction temperature was increased to 160-170° C. by exothermic reaction, and further heated to 170-180° C. while draining condensed water from the reactor. When the temperature reached 210° C., the temperature was maintained to obtain an unsaturated polyester resin binder having a number average molecular weight of 4,300 under acid value 25 and viscosity in styrene of 100 poise.

The unsaturated polyester resin binder was cooled to 190° C. and 0.009 grams of toluhydroquinone as a polymerization inhibitor were added, followed by further cooling to 160° C. The unsaturated polyester resin binder was diluted with a solution of 19.2 grams of styrene monomer, 0.001 grams of p-tert-butyl catechol and 0.00007 grams of copper naphthenate, followed by quenching below 60° C. to obtain a resin.

The physical properties of the resins of Examples 11-13 and Comparative Examples 7-8 are shown in FIG. 7.

The physical properties tabulated in FIG. 7 were determined as follows:

Tensile modulus and flexural modulus were measured in accordance with ISO R3268.

Flexural strength was measured in accordance with ISO R3286.

Refractive index was measured using an ABBE refractometer (3T) at 25° C.

Elongation was measured in accordance with ISO R257.

Specific gravity was measured using a specific gravity bottle (pycnometer) at 25° C.

As shown in FIG. 7, the resins of the Comparative Examples showed poor flexural strength compared with those of the Examples. The flexural modulus of the resins of Comparative Example 8 was also reduced. Further, the specific gravities of the resins of the Comparative Examples were remarkably lowered.

The resins obtained from Examples 11-13 and Comparative Examples 7-8 were each pulverized to size of 0.1-5 mm to prepare artificial stone chips. 100 grams of the prepared artificial stone chips, 100 grams of syrup including polymethylmethacrylate and methyl methacrylate, and 150 grams of aluminum trihydrate were mixed and cured to form an artificial stone. Properties of the respective resulting artificial stones are shown in FIG. 8. The properties for the artificial stones that are tabulated in FIG. 8 were evaluated as follows:

Sanding Property After sanding the surface of the artificial stone with a sand paper, the appearance of the artificial stone chips was evaluated visually.

Thermal Processability The artificial stone was subjected to heating at 180° C. for 20 minutes, followed by curve cutting. Thermal processability was evaluated by measuring minimum radius (R, in millimeters) at which crack or protrusion of the artificial stone chips does not occur.

Dispersion: The dispersion of chips on the surface of the artificial stone was evaluated visually.

Chemical Resistance The surface of the artificial stone chips was evaluated after dipping into 1.0 N of hydrochloric acid and 1.0 N of aqueous ammonia solution at 25° C. for 48 hours.

Levelness: After sanding the surface of the artificial stone, the surface levelness of interface between stone chip and matrix was evaluated visually.

The stone chips obtained from Comparative Examples 7-8 had low specific gravity, and the dispersion of stone chips on the surface of the artificial stone was poor. The thermal processabilities of the artificial stones using the stone chips of Comparative Examples 7-8 were also reduced.

In contrast, the stone chips obtained from Examples 11-13 had a high specific gravity, sufficient to prevent floating chips, and a high refractive index. Further, Examples 11-13 showed good thermal processability at a radius of 150 mm, uniform dispersion of stone chips, good chemical resistance and surface levelness.

As described above, embodiments of the present invention may provide artificial stone chips having good compatibility with a resin matrix, specific gravity, Morse hardness and sanding properties that are the same or substantially the same as those of the matrix, a high refractive index and high transparency. The artificial stone chips may provide a three-dimensional visual effect in an artificial stone article. The artificial stone chips may also provide good dispersibility of a pigment and good compatibility with a matrix, which may reduce or eliminate concavities shown by the artificial stone chips, and may also exhibit good chemical resistance. Further, the artificial stone chips may provide an artificial stone article with a uniform pattern, even over a broad range of curing or molding times, and the artificial stone may have a similar appearance and texture to an engineered stone. The artificial stone may be manufactured continuously, may have good thermal processability and good levelness.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A polymeric artificial stone chip, comprising:
   a cured resin composition that includes:
      a reactive monomer; and
      a binder,
   wherein the binder includes a halogenated urethane acrylate and/or a halogenated epoxyacrylate.

2. The polymeric artificial stone chip as claimed in claim 1, wherein the reactive monomer is one or more selected from the group consisting of methyl acrylate, ethyl acrylate, 2-ethyl hexyl acrylate, octyl acrylate, dodecyl acrylate, octadecyl acrylate, methyl cyclohexyl acrylate, isobornyl acrylate, phenyl acrylate, benzyl acrylate, chlorophenyl acrylate, methoxyphenyl acrylate, bromophenyl acrylate, ethylene glycol diacrylate, 1,2-propylene glycol acrylate, 1,3-butanediol diacrylate, 1,3-propylene glycol acrylate, 1,4-butanediol diacrylate, 1,5-pentanediol diacrylate, neopentyl glycol diacrylate, diethylene glycol diacrylate, triethylene glycol diacrylate, dipropylene glycol diacrylate, trimethylolpropane triacrylate, pentaerythritol triacrylate, pentaerythritol tetraacrylate, dipentaerythritol hexaacrylate, ethoxy ethyl acrylate, ethoxy ethyl methacrylate, 1,6-hexanediol diacrylate, glycerol triacrylate, methylpropanediol diacrylate, methyl methacrylate, ethyl methacrylate, 2-ethyl hexyl methacrylate, octyl methacrylate, dodecyl methacrylate, octadecyl methacrylate, methyl cyclohexyl methacrylate, isobornyl methacrylate, phenyl methacrylate, benzyl methacrylate, chlorophenyl methacrylate, methoxyphenyl methacrylate, bromophenyl methacrylate, ethylene glycol dimethacrylate, 1,2-propylene glycol methacrylate, 1,3-butanediol dimethacrylate, 1,3-propylene glycol methacrylate, 1,4-butanediol dimethacrylate, 1,5-pentanediol dimethacrylate, neopentyl glycol dimethacrylate, diethylene glycol dimethacrylate, triethylene glycol dimethacrylate, dipropylene glycol dimethacrylate, trimethylolpropane trimethacrylate, pentaerythritol trimethacrylate, pentaerythritol tetramethacrylate, dipentaerythritol hexamethacrylate, epoxyacrylate of glycidyl acrylic acid, epoxyacrylate of glycidyl methacrylic acid, 1,6-hexanediol dimethacrylate, glycerol trimethacrylate, methylpropanediol dimethacrylate, styrene, halogenated styrene, vinyl toluene, diallyl terephthalate, diallyl phthalate, diallyl carbonate, divinyl benzene, α-methyl styrene, and α-methyl styrene dimer.

3. The polymeric artificial stone chip as claimed in claim 1, wherein the resin composition includes about 50 to about 90 parts by weight of the binder and about 10 to about 50 parts by weight of the reactive monomer, based on the combined weight of the binder and the reactive monomer.

4. The polymeric artificial stone chip as claimed in claim 1, wherein the binder includes the halogenated urethane acrylate, and the halogenated urethane acrylate has a number average molecular weight of about 900 to about 4,000.

5. The polymeric artificial stone chip as claimed in claim 1, wherein the binder includes the halogenated epoxyacrylate, and the halogenated epoxyacrylate has a number average molecular weight of about 600 to about 3,500.

6. The polymeric artificial stone chip as claimed in claim 1, further comprising relatively small stone particles within the resin composition, such that one or more relatively small stone particles are embedded within the artificial stone chip.

7. The polymeric artificial stone chip as claimed in claim 1, further comprising a second resin composition, the second resin composition including a second reactive monomer and a second binder, wherein:
the second binder includes a halogenated urethane acrylate and/or a halogenated epoxyacrylate, and
the resin composition and the second resin composition differ from one another in one or both of a color and a transparency.

8. The polymeric artificial stone chip as claimed in claim 1, wherein the polymeric artificial stone chip has a specific gravity of about 1.50 to about 1.67.

9. The polymeric artificial stone chip as claimed in claim 1, wherein the cured resin composition is substantially free of inorganic filler.

10. The polymeric artificial stone chip as claimed in claim 1, wherein the polymeric artificial stone chip is transparent.

11. An article of artificial stone, comprising:
a first resin matrix, the first resin matrix including an inorganic filler; and
a plurality of artificial stone chips in the first resin matrix, wherein the specific gravity of the artificial stone chips is the same as or similar to the specific gravity of the first resin matrix to which the artificial stone chips are added, and the artificial stone chips are substantially free of inorganic filler.

12. The article of artificial stone as claimed in claim 11, wherein:
the specific gravity of the artificial stone chips is about 1.50 to about 1.67, and
the specific gravity of the first resin matrix after curing is about 1.52 to about 1.83.

13. The article of artificial stone as claimed in claim 11, wherein the polymeric artificial stone chips are transparent.

14. The article of artificial stone as claimed in claim 11, wherein:
the artificial stone chips include a cured resin composition that includes:
a reactive monomer; and
a binder, and
the binder includes a halogenated urethane acrylate and/or a halogenated epoxyacrylate.

15. The article of artificial stone as claimed in claim 14, wherein the reactive monomer is one or more selected from the group consisting of methyl acrylate, ethyl acrylate, 2-ethyl hexyl acrylate, octyl acrylate, dodecyl acrylate, octadecyl acrylate, methyl cyclohexyl acrylate, isobornyl acrylate, phenyl acrylate, benzyl acrylate, chlorophenyl acrylate, methoxyphenyl acrylate, bromophenyl acrylate, ethylene glycol diacrylate, 1,2-propylene glycol acrylate, 1,3-butanediol diacrylate, 1,3-propylene glycol acrylate, 1,4-butanediol diacrylate, 1,5-pentanediol diacrylate, neopentyl glycol diacrylate, diethylene glycol diacrylate, triethylene glycol diacrylate, dipropylene glycol diacrylate, trimethylolpropane triacrylate, pentaerythritol triacrylate, pentaerythritol tetraacrylate, dipentaerythritol hexaacrylate, ethoxy ethyl acrylate, ethoxy ethyl methacrylate, 1,6-hexanediol diacrylate, glycerol triacrylate, methylpropanediol diacrylate, methyl methacrylate, ethyl methacrylate, 2-ethyl hexyl methacrylate, octyl methacrylate, dodecyl methacrylate, octadecyl methacrylate, methyl cyclohexyl methacrylate, isobornyl methacrylate, phenyl methacrylate, benzyl methacrylate, chlorophenyl methacrylate, methoxyphenyl methacrylate, bromophenyl methacrylate, ethylene glycol dimethacrylate, 1,2-propylene glycol methacrylate, 1,3-butanediol dimethacrylate, 1,3-propylene glycol methacrylate, 1,4-butanediol dimethacrylate, 1,5-pentanediol dimethacrylate, neopentyl glycol dimethacrylate, diethylene glycol dimethacrylate, triethylene glycol dimethacrylate, dipropylene glycol dimethacrylate, trimethylolpropane trimethacrylate, pentaerythritol trimethacrylate, pentaerythritol tetramethacrylate, dipentaerythritol hexamethacrylate, epoxyacrylate of glycidyl acrylic acid, epoxyacrylate of glycidyl methacrylic acid, 1,6-hexanediol dimethacrylate, glycerol trimethacrylate, methylpropanediol dimethacrylate, styrene, halogenated styrene, vinyl toluene, diallyl terephthalate, diallyl phthalate, diallyl carbonate, divinyl benzene, α-methyl styrene, and α-methyl styrene dimer.

16. An article of artificial stone, comprising:
a first resin matrix; and
a plurality of artificial stone chips in the first resin matrix, wherein:
the first resin matrix includes an inorganic filler, and
the artificial stone chips are substantially free of inorganic filler.

17. The article of artificial stone as claimed in claim 16, wherein the specific gravity of the artificial stone chips is the same as or similar to the specific gravity of the first resin matrix to which the artificial stone chips are added.

18. The article of artificial stone as claimed in claim 16, wherein the specific gravity of the artificial stone chips is about 1.50 to about 1.67, and
the specific gravity of the first resin matrix after curing is about 1.52 to about 1.83.

19. The article of artificial stone as claimed in claim 16, wherein the artificial stone chips are transparent.

20. The article of artificial stone as claimed in claim 16, wherein:
the artificial stone chips include a cured resin composition that includes:
a reactive monomer; and
a binder, and
the binder includes a halogenated urethane acrylate and/or a halogenated epoxyacrylate.

21. The article of artificial stone as claimed in claim 20, wherein the reactive monomer is one or more selected from the group consisting of methyl acrylate, ethyl acrylate, 2-ethyl hexyl acrylate, octyl acrylate, dodecyl acrylate, octadecyl acrylate, methyl cyclohexyl acrylate, isobornyl acrylate, phenyl acrylate, benzyl acrylate, chlorophenyl acrylate, methoxyphenyl acrylate, bromophenyl acrylate, ethylene glycol diacrylate, 1,2-propylene glycol acrylate, 1,3-butanediol diacrylate, 1,3-propylene glycol acrylate, 1,4-butanediol diacrylate, 1,5-pentanediol diacrylate, neopentyl glycol diacrylate, diethylene glycol diacrylate, triethylene glycol diacrylate, dipropylene glycol diacrylate, trimethylolpropane triacrylate, pentaerythritol triacrylate, pentaerythritol tetraacrylate, dipentaerythritol hexaacrylate, ethoxy ethyl acrylate, ethoxy ethyl methacrylate, 1,6-hexanediol diacrylate, glycerol triacrylate, methylpropanediol diacrylate, methyl methacrylate, ethyl methacrylate, 2-ethyl hexyl methacrylate, octyl methacrylate, dodecyl methacrylate, octadecyl methacrylate, methyl cyclohexyl methacrylate, isobornyl methacrylate, phenyl methacrylate, benzyl methacrylate, chlorophenyl methacrylate, methoxyphenyl methacrylate, bromophenyl methacrylate, ethylene glycol dimethacrylate, 1,2-propylene glycol methacrylate, 1,3-butanediol dimethacrylate, 1,3-propylene glycol methacrylate, 1,4-butanediol dimethacrylate, 1,5-pentanediol dimethacrylate, neopentyl glycol dimethacrylate, diethylene glycol dimethacrylate, triethylene glycol dimethacrylate, dipropylene glycol dimethacrylate, trimethylolpropane trimethacrylate, pentaerythritol trimethacrylate, pentaerythritol tetramethacrylate, dipentaerythritol hexamethacrylate, epoxyacrylate of glycidyl acrylic acid, epoxyacrylate of glycidyl methacrylic acid, 1,6-hexanediol dimethacrylate, glycerol trimethacrylate, methylpropanediol dimethacrylate, styrene, halogenated styrene, vinyl toluene, diallyl terephthalate, diallyl phthalate, diallyl carbonate, divinyl benzene, α-methyl styrene, and α-methyl styrene dimer.

* * * * *